United States Patent
Sinclair (10) Patent No.: US 8,429,352 B2
(45) Date of Patent: Apr. 23, 2013

(54) METHOD AND SYSTEM FOR MEMORY BLOCK FLUSHING

(75) Inventor: Alan W. Sinclair, Falkirk (GB)

(73) Assignee: SanDisk Technologies Inc., Plano, TX (US)

(*) Notice: Subject to any disclaimer, the term of this patent is extended or adjusted under 35 U.S.C. 154(b) by 948 days.

(21) Appl. No.: 12/036,023

(22) Filed: Feb. 22, 2008

(65) Prior Publication Data

US 2008/0307164 A1    Dec. 11, 2008

Related U.S. Application Data (60) Provisional application No. 60/942,900, filed on Jun. 8, 2007.

(51) Int. Cl.
*G06F 12/02*    (2006.01)

(52) U.S. Cl.
USPC .... 711/135; 711/157; 711/165; 711/E12.008; 707/813; 707/818

(58) Field of Classification Search .................. None
See application file for complete search history.

(56) References Cited

U.S. PATENT DOCUMENTS

| | | |
|---|---|---|
| 5,535,369 A | 7/1996 | Wells et al. |
| 5,570,315 A | 10/1996 | Tanaka et al. |
| 5,630,093 A | 5/1997 | Holzhammer et al. |
| 5,774,397 A | 6/1998 | Endoh et al. |

(Continued)

FOREIGN PATENT DOCUMENTS

| | | |
|---|---|---|
| EP | 1143455 A2 | 10/2001 |
| EP | 1389755 A2 | 2/2004 |
| EP | 1693759 A2 | 8/2006 |

OTHER PUBLICATIONS

F. Shu, "Solid State Drive Identify Proposal for ATA8-ACS", Microsoft Corporation, dated Apr. 21, 2007, printed from the Internet at http://www.t13.org/documents/UploadedDocuments//docs2007/e07153r0-Soild_State_Drive_Identify_Proposal.doc on Feb. 22, 2008, 4 pages.

(Continued)

*Primary Examiner* — Michael Krofcheck (74) *Attorney, Agent, or Firm* — Brinks Hofer Gilson & Lione (57) ABSTRACT

A method and system for flushing physical memory blocks in a memory device is disclosed. The method includes detecting a quantity of available memory, background flushing partially obsolete memory blocks if the quantity decreases to a background activation threshold, disabling the background flushing if the quantity increases to a background deactivation threshold, foreground flushing the partially obsolete memory blocks if the quantity decreases to a foreground activation threshold, and disabling the foreground flushing if the quantity increases to a foreground deactivation threshold. The thresholds may be adaptively defined. The background flushing may occur when the host interface is idle. The foreground flushing may interleave writing operations with flushing operations while a write command is unfinished. The system includes a memory for receiving data with a host write command, and a controller for detecting a quantity of available memory and enabling and disabling background and foreground flushing depending on adaptive thresholds.

24 Claims, 7 Drawing Sheets

U.S. PATENT DOCUMENTS

| | | | |
|---|---|---|---|
| 5,860,124 | A | 1/1999 | Matthews et al. |
| 5,960,169 | A * | 9/1999 | Styczinski ............... 711/114 |
| 6,046,935 | A | 4/2000 | Takeuchi et al. |
| 6,069,827 | A | 5/2000 | Sinclair |
| 6,373,746 | B1 | 4/2002 | Takeuchi et al. |
| 6,456,528 | B1 | 9/2002 | Chen |
| 6,522,580 | B2 | 2/2003 | Chen et al. |
| 6,622,199 | B1 * | 9/2003 | Spall et al. ............... 711/103 |
| 6,715,027 | B2 * | 3/2004 | Kim et al. ............... 711/103 |
| 6,725,321 | B1 | 4/2004 | Sinclair et al. |
| 6,771,536 | B2 | 8/2004 | Li et al. |
| 6,781,877 | B2 | 8/2004 | Cernea et al. |
| 7,154,781 | B2 | 12/2006 | Lakhani et al. |
| 7,420,867 | B2 | 9/2008 | Brox |
| 7,433,993 | B2 | 10/2008 | Sinclair |
| 7,552,280 | B1 * | 6/2009 | Naamad et al. ............ 711/114 |
| 7,930,468 | B2 | 4/2011 | Caulkins |
| 8,095,735 | B2 | 1/2012 | Brewer et al. |
| 2003/0109093 | A1 | 6/2003 | Harari et al. |
| 2003/0147278 | A1 | 8/2003 | Tanaka et al. |
| 2003/0229753 | A1 | 12/2003 | Hwang et al. |
| 2004/0030847 | A1 * | 2/2004 | Tremaine .................. 711/154 |
| 2004/0260957 | A1 | 12/2004 | Jeddeloh et al. |
| 2005/0144361 | A1 | 6/2005 | Gonzalez et al. |
| 2005/0144363 | A1 | 6/2005 | Sinclair |
| 2005/0195635 | A1 | 9/2005 | Conley et al. |
| 2005/0278479 | A1 | 12/2005 | Wu et al. |
| 2006/0020744 | A1 | 1/2006 | Sinclair et al. |
| 2006/0031593 | A1 | 2/2006 | Sinclair |
| 2006/0047800 | A1 | 3/2006 | Caveney et al. |
| 2006/0161724 | A1 * | 7/2006 | Bennett et al. ............ 711/103 |
| 2006/0161728 | A1 * | 7/2006 | Bennett et al. ............ 711/103 |
| 2006/0285397 | A1 | 12/2006 | Nishihara et al. |
| 2007/0016756 | A1 | 1/2007 | Hsieh et al. |
| 2007/0033323 | A1 | 2/2007 | Gorobets |
| 2007/0033330 | A1 * | 2/2007 | Sinclair et al. ............ 711/103 |
| 2007/0033378 | A1 * | 2/2007 | Sinclair et al. ............ 711/103 |
| 2007/0136555 | A1 | 6/2007 | Sinclair |
| 2007/0239928 | A1 * | 10/2007 | Gera et al. ............... 711/103 |
| 2008/0034154 | A1 | 2/2008 | Lee et al. |
| 2008/0094952 | A1 * | 4/2008 | Brondijk et al. ........... 369/44.29 |
| 2008/0307192 | A1 | 12/2008 | Sinclair et al. |
| 2008/0320209 | A1 | 12/2008 | Lee et al. |
| 2009/0157994 | A1 | 6/2009 | Hampel et al. |
| 2009/0172258 | A1 | 7/2009 | Olbrich et al. |
| 2009/0172263 | A1 | 7/2009 | Olbrich et al. |
| 2009/0196102 | A1 | 8/2009 | Kim |
| 2009/0271562 | A1 | 10/2009 | Sinclair |

OTHER PUBLICATIONS

F. Shu, "Notification of Deleted Data Proposal for ATA8-ACS2", Microsoft Corporation, dated Apr. 21, 2007, printed from the Internet at http://www.t13.org/documents/UploadedDocuments//docs2007/e07154r0-Notification_for_Deleted_Data_Proposal_for_ATA-ACS2.doc on Feb. 22, 2008, 4 pages.

Co-Pending U.S. Appl. No. 12/036,014, filed Feb. 22, 2008 for "Method and System for Storage Address Re-Mapping for a Memory Device".

Co-Pending U.S. Appl. No. 12/110,050, filed Apr. 25, 2008 for "Method and System for Storage Access Re-Mapping for a Multi-Bank Memory Device", 81 pages.

International Search Report and Written Opinion for PCT/US2008/065631 dated Oct. 30, 2008, 9 pages.

International Search Report for international application No. PCT/US2009/040153 dated Jul. 10, 2009.

Office Action issued in U.S. Appl. No. 12/036,014 dated May 25, 2011.

Office Action issued in U.S. Appl. No. 12/036,014 dated Sep. 28, 2011.

Office Action issued in U.S. Appl. No. 12/036,014 dated Jun. 21, 2012.

Office Action issued in U.S. Appl. No. 12/110,050 dated Jul. 7, 2011.

PCT Preliminary Report on Patentability and Written Opinion of International Searching Authority for related application PCT/US2008/065631 mailed Dec. 23, 2009 (5 pages).

Supplementary European Search Report issued in European patent No. 08756648.5 dated Jun. 6, 2012.

Written Opinion for international application No. PCT/US2009/040153 dated Jul. 10, 2009.

Chang et al. "An Efficient Management Scheme for Large-Scale Flash Memory Storage Systems," dated Mar. 14-17, 2004.

International Preliminary Report on Patentability for International Application No. PCT/US2010/056122, mailed Jun. 21, 2012.

International Search Report Issued in International Application No. PCT/US2010/056122, mailed May 20, 2011.

Written Opinion issued in International Application No. PCT/US2010/056122, mailed May 20, 2011.

U.S. Office Action dated Feb. 7, 2012 for co-pending U.S. Appl. No. 12/632,549.

U.S. Final Office Action dated Aug. 20, 2012 for co-pending U.S. Appl. No. 12/632,549.

Taiwanese Search Report issued in Taiwanese application No. 097121253, dated Apr. 18, 2012 (1 page).

* cited by examiner

METHOD AND SYSTEM FOR MEMORY BLOCK FLUSHING

CROSS-REFERENCE TO RELATED APPLICATION

This application claims the benefit of U.S. provisional application Ser. No. 60/942,900, filed Jun. 8, 2007, the entirety of which is hereby incorporated by reference.

TECHNICAL FIELD

This application relates generally to memory devices. More specifically, this application relates to managing housekeeping operations in reprogrammable non-volatile semiconductor flash memory.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. When writing data to a conventional flash memory system, a host typically writes data to, and reads data from, addresses within a logical address space of the memory system. The memory system then commonly maps data between the logical address space and the physical blocks or metablocks of the memory, where data is stored in fixed logical groups corresponding to ranges in the logical address space. Generally, each fixed logical group is stored in a separate physical block of the memory system. The memory system keeps track of how the logical address space is mapped into the physical memory but the host is unaware of this. The host keeps track of the addresses of its data files within the logical address space but the memory system generally operates without knowledge of this mapping.

A drawback of memory systems that operate in this manner is fragmentation. For example, data written to a solid state disk (SSD) drive in a personal computer (PC) operating according to the NTFS file system is often characterized by a pattern of short runs of contiguous addresses at widely distributed locations within the logical address space of the drive. Even if the file system used by a host allocates sequential addresses for new data for successive files, the arbitrary pattern of deleted or updated files causes fragmentation of the available free memory space such that it cannot be allocated for new file data in blocked units.

The deletion or updating of files by the host may cause some data in a physical block in the memory system to become obsolete, resulting in partially obsolete blocks that contain both valid and obsolete data. These physical blocks partially filled with obsolete data represent memory capacity that cannot be used until the valid data in the block is moved to another block so that the original block may be erased and made available for receiving more data. The process of moving the valid data into another block and preparing the original block for receiving new data is sometimes referred to as a housekeeping function or garbage collection. As a memory system accumulates obsolete blocks, e.g., blocks partially filled with obsolete data, those blocks are unavailable for receiving new data. When enough of the obsolete blocks accumulate, the memory device may be unable to service requests from the host and housekeeping functions may be necessary.

The write performance of a memory device is generally specified by two numbers. The first number is the burst write speed. Burst write speed is the rate at which the memory device can absorb an input stream of data when there is enough room in the memory device. The burst write speed may vary depending on a requested level of service defined for the data being written. The second number is the sustained write speed. Sustained write speed is the rate at which the memory device can absorb streams of input data that are much larger than the available write blocks.

A typical factor influencing when to initiate housekeeping functions such as garbage collection is whether the host interface is idle or active. Memory devices may perform garbage collection in the background, when the host interface is idle, or in the foreground, when the host interface is active. The host interface may be idle when no read or write commands are received from the host. A background garbage collection function may operate when the host interface is idle, and may be disabled when the host interface becomes active. Background garbage collection generally does not affect the sustained write speed and does not limit the ability of the memory device to burst write data at maximum speed. On the other hand, the host interface may be active when a read or write command is received from the host. A foreground garbage collection function may operate when the host interface is active and may thus reduce the sustained write speed. The burst write speed, the sustained write speed, the life of the memory device, and other memory device parameters may be affected by the garbage collection or other housekeeping operation.

SUMMARY

In order to address the problems noted above, a method and system for memory block flushing is disclosed.

According to a first aspect of the invention, a method is disclosed for flushing memory blocks in a memory device in communication with a host. The method includes detecting a quantity of available memory in the memory device, where the available memory includes unwritten capacity in memory blocks. The method also includes background flushing of partially obsolete memory blocks if the quantity of available memory decreases to a background activation threshold, where partially obsolete memory blocks include memory blocks having only obsolete and valid data. Background flushing includes relocating valid data from the partially obsolete memory blocks to the available memory when a host interface is idle. The background flushing may be disabled if the quantity of available memory increases to a background deactivation threshold that is greater than the background activation threshold. The method further includes foreground flushing of the partially obsolete memory blocks if the quantity of available memory decreases to a foreground activation threshold. Foreground flushing includes after a host write command is received, interleaving host writing operations and flushing operations while the host write command is unfinished. The foreground flushing may be disabled if the quantity of available memory increases to a foreground deactivation threshold that is greater than the foreground activation threshold.

According to another aspect, a method of flushing memory blocks in a memory device in communication with a host is disclosed. The method includes detecting a quantity of available memory in the memory device, where the available memory includes unwritten capacity in memory blocks. The method also includes relocating valid data from partially obsolete memory blocks to the available memory when no host write command is received if the quantity of available memory reaches a background activation threshold, where the partially obsolete memory blocks include memory blocks having only obsolete data and valid data. The method further includes after receiving the host write command, interleaving between steps of storing data received with the host write command to the available memory and steps of relocating valid data from the partially obsolete memory blocks to the available memory, while the host write command is unfinished if the quantity of available memory reaches a foreground activation threshold that is less than the background activation threshold.

In another aspect of the invention, a memory device includes a memory configured to receive data associated with a host write command, where the memory includes partially obsolete memory blocks, memory blocks having available memory and a controller. The available memory includes unwritten capacity, and the partially obsolete memory blocks have only obsolete data and valid data. The controller is configured to detect a quantity of the available memory, background flush the partially obsolete memory blocks if the quantity of the available memory decreases to a background activation threshold, including relocating valid data from the partially obsolete memory blocks to the available memory when host commands are not received, and disable the background flush if the quantity of the available memory increases to a background deactivation threshold that is greater than the background activation threshold. The controller is also configured to foreground flush the partially obsolete memory blocks if the quantity of the available memory decreases to a foreground activation threshold, including after the host write command is received, interleaving host writing operations and flushing operations while the host write command is unfinished, and disable the foreground flush if the quantity of available memory increases to a foreground deactivation threshold that is greater than the foreground activation threshold.

According to another aspect, a processor readable medium is disclosed having processor executable instructions for flushing memory blocks in a memory device. The instructions are configured to cause a processor to detect a quantity of available memory in the memory device, where the available memory includes memory blocks having unwritten capacity. The instructions are also configured to cause background flushing of partially obsolete memory blocks if the quantity of available memory decreases to a background activation threshold, where the partially obsolete memory blocks have memory blocks having only obsolete data and valid data, and where background flushing is the relocation of valid data from the partially obsolete memory blocks to the available memory when a host interface is idle. The instructions are arranged to disable the background flushing if the quantity of available memory increases to a background deactivation threshold that is greater than the background activation threshold. The instructions are further configured to cause foreground flushing of the partially obsolete memory blocks if the quantity of available memory decreases to a foreground activation threshold. Foreground flushing consists of, after a host write command is received, interleaving host writing operations and flushing operations while the host write command is unfinished, where the host writing operations are steps of storing data received with the host write command to the available memory and the flushing operations are steps of relocating valid data from the partially obsolete memory blocks to the available memory. If the quantity of available memory increases to a foreground deactivation threshold that is greater than the foreground activation threshold, the instructions are further configured to cause the processor to disable the foreground flushing.

BRIEF DESCRIPTION OF THE PRESENTLY PREFERRED EMBODIMENTS

Figure 1:
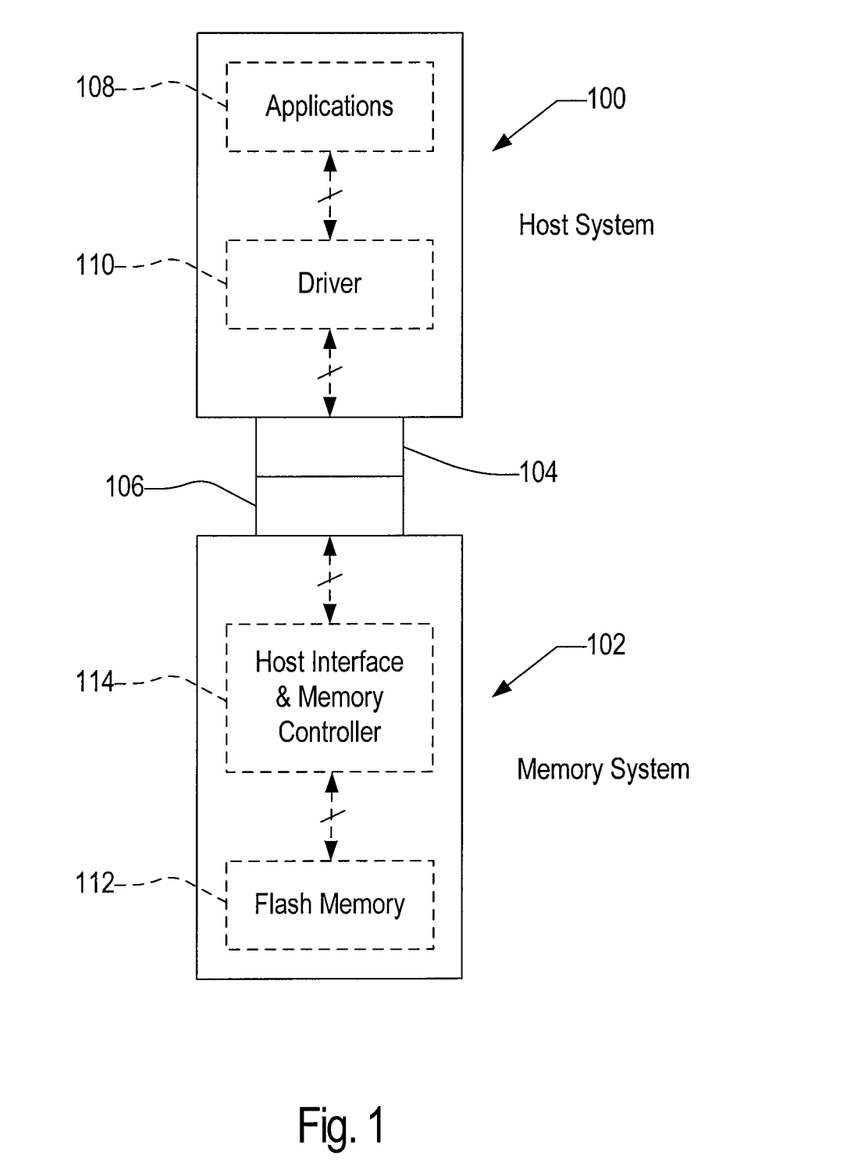
FIG. 1 is a block diagram of a host connected with a memory system having non-volatile memory.
Figure 2:
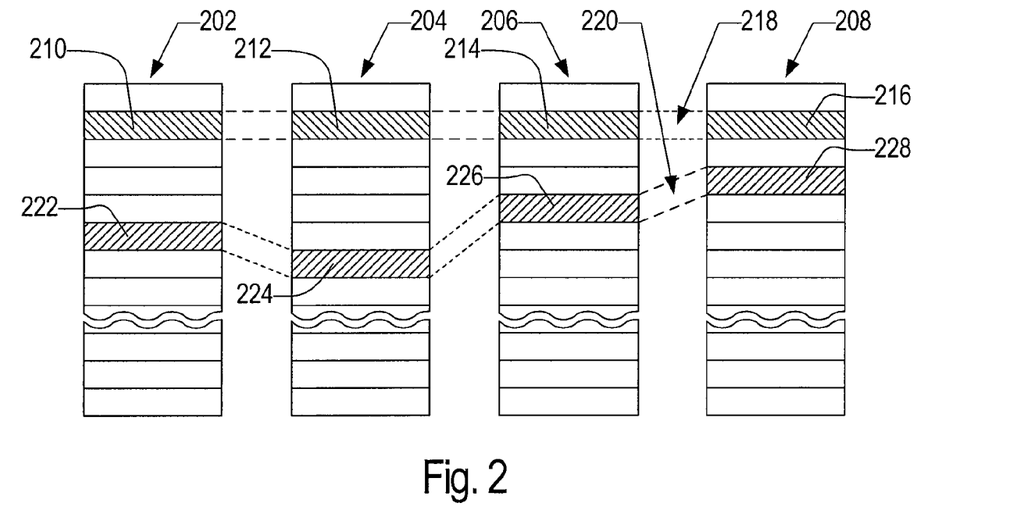
FIG. 2 illustrates an example physical memory organization of the system of FIG. 1.
Figure 3:
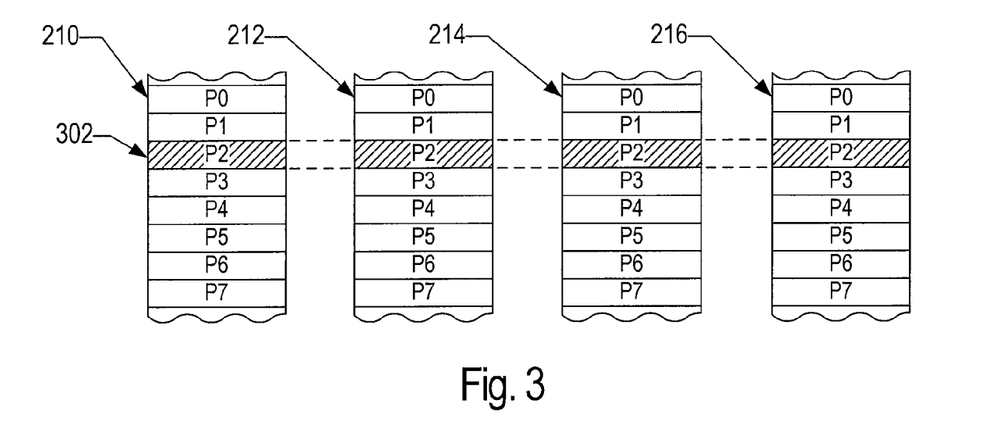
FIG. 3 shows an expanded view of a portion of the physical memory of FIG. 2.

A flash memory system suitable for use in implementing aspects of the invention is shown in FIGS. 1-3. A host system 100 of FIG. 1 stores data into and retrieves data from a flash memory 102. The flash memory may be embedded within the host, such as in the form of a solid state disk (SSD) drive installed in a personal computer. Alternatively, the memory 102 may be in the form of a card that is removably connected to the host through mating parts 104 and 106 of a mechanical and electrical connector as illustrated in FIG. 1. A flash memory configured for use as an internal or embedded SSD drive may look similar to the schematic of FIG. 1, with the primary difference being the location of the memory system 102 internal to the host. SSD drives may be in the form of discrete modules that are drop-in replacements for rotating magnetic disk drives.

One example of a commercially available SSD drive is a 32 gigabyte SSD produced by SanDisk Corporation. Examples of commercially available removable flash memory cards include the CompactFlash (CF), the MultiMediaCard (MMC), Secure Digital (SD), miniSD, Memory Stick, SmartMedia and TransFlash cards. Although each of these cards has a unique mechanical and/or electrical interface according to its standardized specifications, the flash memory system included in each is similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, cellular telephones, personal digital assistants (PDAs), digital still cameras, digital movie cameras and portable audio players. For portable memory card applications, a host may include a built-in receptacle for one or more types of memory cards or flash drives, or a host may require adapters into which a memory card is plugged. The memory system usually contains its own memory controller and drivers but there are also some memory-only systems that are instead controlled by software executed by the host to which the memory is connected. In some memory systems containing the controller, especially those embedded within a host, the memory, controller and drivers are often formed on a single integrated circuit chip.

The host system 100 of FIG. 1 may be viewed as having two major parts, insofar as the memory 102 is concerned, made up of a combination of circuitry and software. They are an applications portion 108 and a driver portion 110 that interfaces with the memory 102. In a PC, for example, the applications portion 108 can include a processor running word processing, graphics, control or other popular application software. In a camera, cellular telephone or other host system that is primarily dedicated to performing a single set of functions, the applications portion 108 includes the software that operates the camera to take and store pictures, the cellular telephone to make and receive calls, and the like.

The memory system 102 of FIG. 1 includes flash memory 112, and circuits 114 that both interface with the host to which the card is connected for passing data back and forth and control the memory 112. The controller 114 typically converts between logical addresses of data used by the host 100 and physical addresses of the memory 112 during data programming and reading.

FIG. 2 conceptually illustrates an organization of the flash memory cell array 112 (FIG. 1) that is used as an example in further descriptions below. Four planes or sub-arrays 202, 204, 206, and 208 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into groups of memory cells that form the minimum unit of erase, hereinafter referred to as erase blocks. Erase blocks of memory cells are shown in FIG. 2 by rectangles, such as erase blocks 210, 212, 214, and 216, located in respective planes 202, 204, 206, and 208. There can be dozens or hundreds of erase blocks in each plane.

As mentioned above, the erase block of memory cells is the unit of erase, the smallest number of memory cells that are physically erasable together. For increased parallelism, however, the erase blocks are operated in larger metablock units. One erase block from each plane is logically linked together to form a metablock. The four erase blocks 210, 212, 214, and 216 are shown to form one metablock 218. All of the cells within a metablock are typically erased together. The erase blocks used to form a metablock need not be restricted to the same relative locations within their respective planes, as is shown in a second metablock 220 made up of erase blocks 222, 224, 226, and 228. Although it is usually preferable to extend the metablocks across all of the planes, for high system performance, the memory system can be operated with the ability to dynamically form metablocks of any or all of one, two or three erase blocks in different planes. This allows the size of the metablock to be more closely matched with the amount of data available for storage in one programming operation.

The individual erase blocks are in turn divided for operational purposes into pages of memory cells, as illustrated in FIG. 3. The memory cells of each of the blocks 210, 212, 214, and 216, for example, are each divided into eight pages P0-P7. Alternatively, there may be 16, 32 or more pages of memory cells within each block. The page is the unit of data programming and reading within an erase block, containing the minimum amount of data that are programmed or read at one time. However, in order to increase the memory system operational parallelism, such pages within two or more erase blocks may be logically linked into metapages. A metapage 302 is illustrated in FIG. 3, being formed of one physical page from each of the four erase blocks 210, 212, 214, and 216. The metapage 302, for example, includes the page P2 in each of the four blocks but the pages of a metapage need not necessarily have the same relative position within each of the blocks. A metapage is the maximum unit of programming.

An overview of an exemplary data management scheme that may be used with the memory system 102 is illustrated in FIGS. 4-8. This data management scheme, also referred to as storage address remapping, operates to take logical block addresses (LBAs) associated with data sent by the host and remaps them to a second logical address space or directly to physical address space in an order the data is received from the host. Each LBA corresponds to a sector, which is the minimum unit of logical address space addressable by a host. A host will typically assign data in clusters that are made up of one or more sectors. Also, in the following discussion, the term block is a flexible representation of storage space and may indicate an individual erase block or, as noted above, a logically interconnected set of erase blocks defined as a metablock. If the term block is used to indicate a metablock, then a corresponding logical block of LBAs should consist of a block of addresses of sufficient size to address the complete physical metablock.

Figure 4:
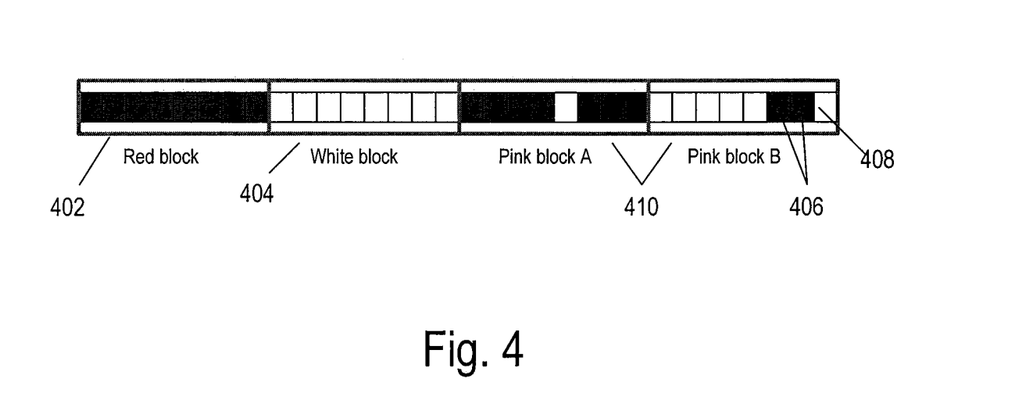
FIG. 4 illustrates a typical pattern of allocated and free clusters by blocks in an exemplary data management scheme.

FIG. 4 illustrates a typical pattern of allocated and free clusters by blocks in the memory system 102 and the flash memory 112. Data to be written from the host system 100 to the memory system 102 may be addressed by clusters of one or more sectors managed in blocks. A write operation may be handled by writing data into individual blocks, and completely filling that block with data in the order data is received, regardless of the LBA order of the data, before proceeding to the next available block. This allows data to be written in completed blocks by creating blocks with only unwritten capacity by means of flushing operations on partially obsolete blocks containing obsolete and valid data. In the following description, blocks completely filled with valid data are referred to as red blocks 402, blocks with only unwritten capacity are referred to as white blocks 404, and partially obsolete blocks with both valid (allocated) 406 and obsolete (deallocated) 408 data are referred to as pink blocks 410.

For example, a white block 404 may be allocated as the sole location for writing data, and the addresses of the white block 404 may be sequentially associated with data at the current position of its write pointer in the order it is provided by the host. When a block of storage addresses becomes fully allocated to valid data, it is known as a red block 402. When files are deleted or updated by the host, some addresses in a red block 402 may no longer be allocated to valid data, and the block becomes known as a pink block 410.

A white block 404 may be created from a pink block 410 by relocating valid data from the pink block 410 to a relocation block, an operation known as flushing. The relocation block may be a newly allocated white block 404 if no unwritten capacity exists in a prior relocation block. As with the write operation from a host described above, the relocation of valid data in the flush operation may not be tied to keeping any particular block of addresses together. Thus, valid data being flushed from a pink block 410 to the current relocation block is copied in the order it appears in the pink block to sequential locations in the relocation block and the relocation block may contain other valid data relocated from other, unrelated pink blocks. Flush operations may be performed as background operations or foreground operations, to transform pink blocks 410 into white blocks 404. A background flush of pink blocks may operate when the host interface is idle, and may be disabled when the host interface becomes active. A foreground flush of pink blocks may operate when the host interface is active and interleave data writing operations with physical block flushing operations until a write command is completed.

A pink block 410 may be selected for a flush operation according to its characteristics. In one implementation, a pink block 410 with the least amount of valid data (i.e., the fewest shaded clusters in FIG. 4) would be selected because fewer addresses with valid data results in less data needing relocation when that particular pink block is flushed. In this implementation, the pink block 410 is not selected in response to specific write, read, and/or erase operations performed by the host. Thus, in the example of FIG. 4, pink block B would be selected in preference to pink block A because pink block B has fewer addresses with valid data. Selection of pink blocks as flush blocks in this manner allows performance of block flush operations with a minimum relocation of valid data because any pink block so selected will have accumulated a maximum amount of unallocated data due to deletion or updating of files by the host. Alternatively, the selected pink block for a flush operation may be based on other parameters, such as a calculated probability of further erasures or updates in a particular pink block.

In one implementation of the flushing algorithm, a pink block may be selected for a flush operation based on a block information table (BIT) maintained by the memory system 102. The BIT is created by the memory system 102 and stored in flash memory 112. The BIT contains lists of types of blocks (such as pink blocks, white blocks) and, for pink blocks, stores LBA run data associated with each pink block. The memory system 102 takes the LBA run information found in the BIT for a given pink block and looks up the amount of valid data associated with the LBA run in a storage address table (SAT). The SAT is another table maintained by the memory system, where the SAT tracks the relation of each host assigned LBA address to its storage address in the memory system. Where the storage address re-mapping algorithm is integrated in the memory controller 114, the storage address is the physical block address in flash memory 112. In other implementations of the storage address re-mapping algorithm, the LBA addresses assigned by the host may be translated by an application program on the host or on the memory device to a second logical address space that is then used by a legacy memory controller to map to physical addresses. In any of the storage address re-mapping implementations noted above, the BIT and SAT may contain the data needed to select the pink blocks with the least amount of valid data for flushing.

Figure 5:
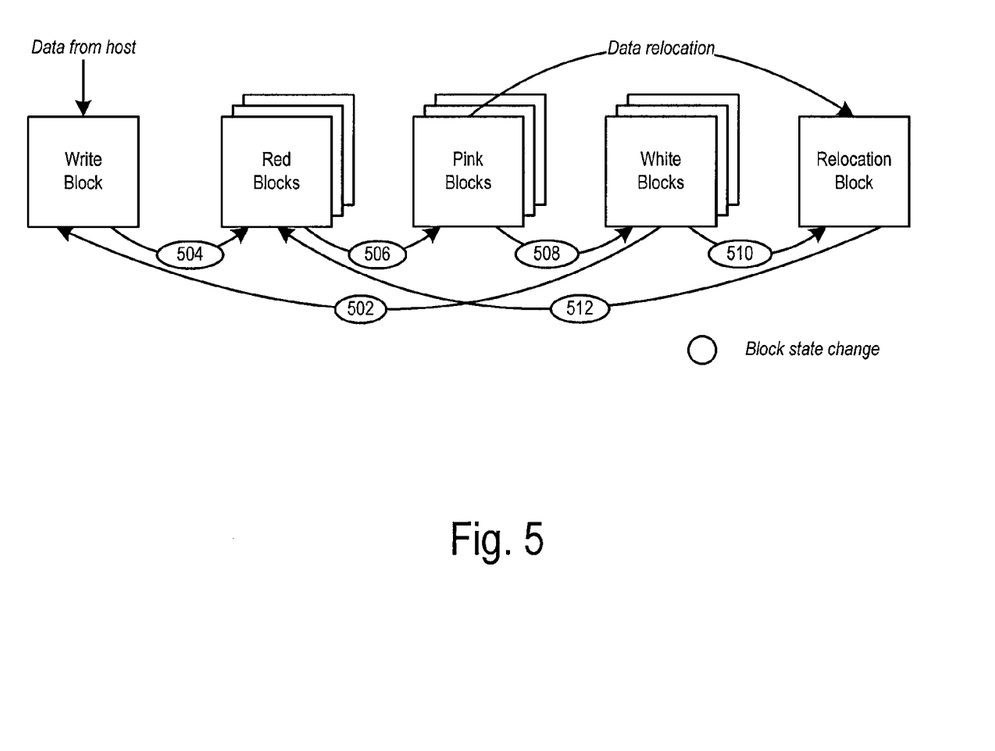
FIG. 5 is a state diagram of the allocation of blocks of clusters.

FIG. 5 is a state diagram of the allocation of blocks according to an embodiment of a flush algorithm. As noted above, address space may be allocated in terms of blocks and a block is filled up before allocating another block of clusters. This may be accomplished by first allocating a white block 404 to be the current write block to which data from the host is written, where the data from the host is written to the write block in sequential order according to the time it is received (at step 502). When the last page in the current write block is filled, the current write block becomes a red block (at step 504) and a new write block is allocated from the pool of white blocks. It should be noted that the current write block may also make a direct transition to a pink block if some pages within the current write block have already become obsolete before the current write block is filled. This transition is not shown, for clarity; however it could be represented by an arrow from the write block to a pink block.

When one or more pages within a red block are made obsolete by deletion or updating of files, the red block becomes a pink block (at step 506). The memory system may detect the quantity of available memory, including the quantity of white blocks or memory blocks having at least a portion of unwritten capacity. There may be a need for more white blocks if certain thresholds are reached, described in more detail below. When there is a need for more white blocks, a flush operation may move the valid data from a pink block to available memory so that the pink block becomes a white block (at step 508). In order to flush a pink block, the valid data of a pink block is sequentially relocated to a white block that has been designated as a relocation block (at steps 508 and 510). Once the relocation block is filled, it becomes a red block (at step 512). As noted above with reference to the write block, a relocation block may also make the direct transition to a pink block if some pages within it have already become obsolete. This transition is not shown, for clarity, but could be represented by an arrow from the relocation block to a pink block in FIG. 5.

Figure 6:
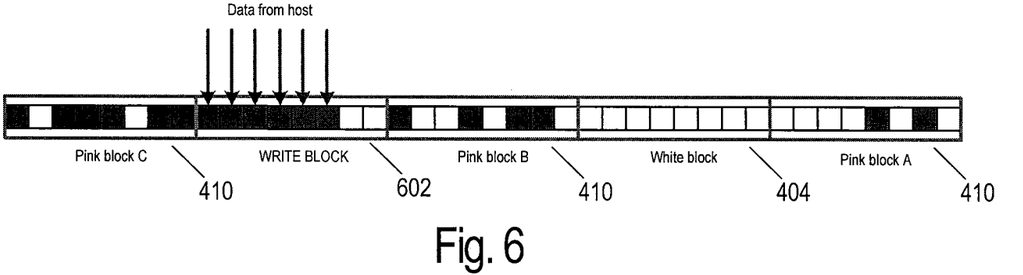
FIG. 6 illustrates an example pattern of allocated and free clusters in blocks and of data written to the memory system from a host.
Figure 7:
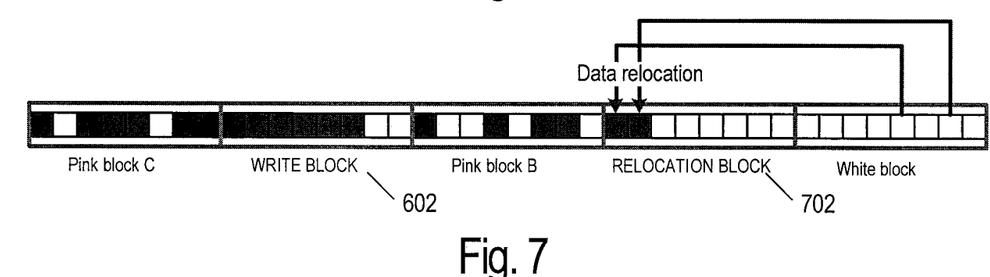
FIG. 7 illustrates an example of a flush operation of a physical block.
Figure 8:
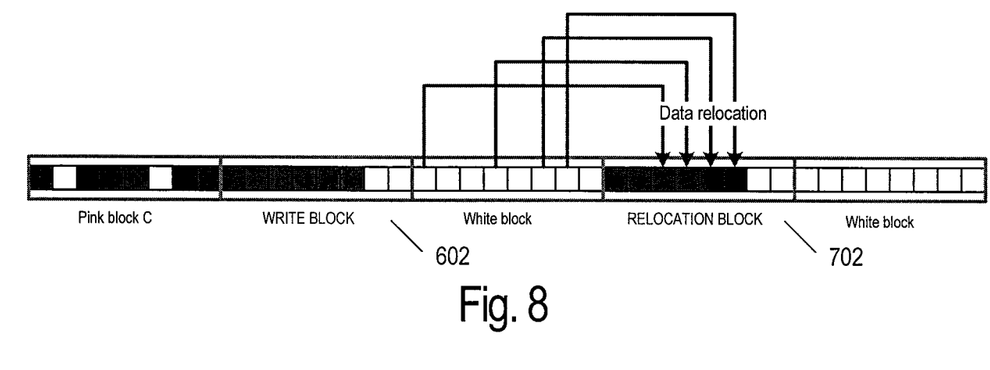
FIG. 8 illustrates a second example of a flush operation of a physical block following the flush operation of FIG. 7.

FIG. 6 illustrates an example pattern of valid data (shaded squares), obsolete data (unshaded squares in pink blocks A-C 410) and unwritten capacity (unshaded squares in write block 602 and white block 404) in the memory system. Each of the shaded or unshaded squares of the blocks of squares illustrated in FIGS. 6-8 represents a subunit of addresses in an erase block, or a metablock. These subunits of addresses, although shown as having equal size for purposes of simplifying this illustration, may be of the same size or different size.

In the physical blocks shown in FIG. 6, obsolete data 408 are dispersed at essentially random locations. When the host has data to write to the memory device, the write block 602 may be written to in sequential order such that contiguous locations in the write block 602 are filled. The locations in the write block 602 do not necessarily have to be filled in one operation. When a write block 602 becomes filled, a white block 404 may be allocated as the next write block 602.

An illustration of a flush operation of a physical block is shown in FIGS. 6-8. A white block 404 may be designated as a relocation block 702, to which data is to be flushed from selected pink blocks to create additional white blocks. Data is relocated from locations containing valid data in the flush block (in this example, shaded squares of pink block A of FIG. 6) to sequential clusters of available capacity in the relocation block 702 (shown as unshaded squares in White block 404), to convert the flush block to a white block 404. A next flush block (pink block B of FIG. 6) may be identified from the remaining pink blocks as illustrated in FIG. 8. The pink block 410 with the least amount of valid data is again designated as the flush block and the valid data of the selected pink block 410 is transferred to sequential locations in the open relocation block.

Flush operations on pink blocks may be performed as background operations to create white blocks at a rate sufficient to compensate for the consumption of white blocks that are designated as write blocks. Flush operations may also be performed as foreground operations to create additional white blocks as needed. The example of FIGS. 6-8 illustrates how a write block and a relocation block may be separately maintained for new data from the host and for relocated data from pink blocks. In other implementations, the new data and the relocated data may be transferred to a single write block without the need for separate write and relocation blocks. Also, in order to track the remapping of host LBA data, the storage address table (SAT) noted above is generated and stored in the memory system 102 that records the host LBA addresses mapped by the host to storage addresses (physical or logical) depending on the implementation of the storage address remapping algorithm recognized by the memory system 102.

Figure 9:
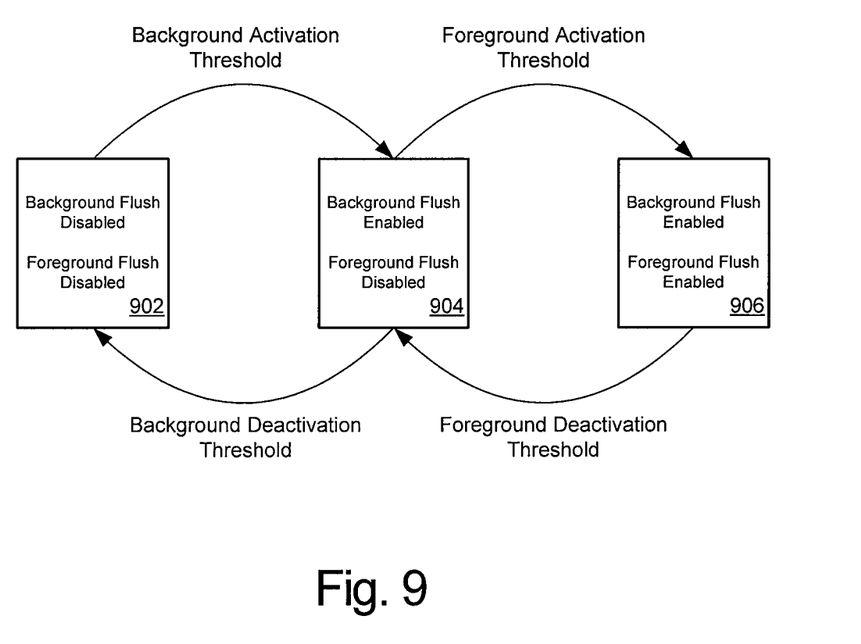
FIG. 9 is a state diagram of background and foreground flush activity states.

FIG. 9 is a state diagram of background and foreground flush activity states. The memory system 102 may enable and disable background and foreground flushing based on adaptive thresholds of the quantity of available memory. Available memory may include memory blocks having at least a portion of unwritten capacity or white blocks 404 having only unwritten capacity. Using adaptive thresholds to control flush activity may minimize the amount of data relocated and accordingly prolong the life of the memory device because background and foreground flush operations would occur only when enabled. In addition, controlling flush activity with adaptive thresholds may allow data to be written from the host at the maximum sustained write speed in most cases and also at desired predetermined burst write speeds. The adaptive thresholds may include a background activation threshold to enable background flushing, a background deactivation threshold to disable background flushing, a foreground activation threshold to enable foreground flushing, and a foreground deactivation threshold to disable foreground flushing. Other thresholds may also be used to enable and disable background and foreground flushing.

The thresholds may be set to minimize flushing operations and allow accumulation of the maximum amount of obsolete data in pink blocks 410 that may be selected for flush operations. In this way, a minimal amount of valid data is relocated when flushing is performed. For example, the background activation threshold and the background deactivation threshold may be initially set at 5% and 10%, respectively, of the quantity of available memory. The foreground activation threshold and the foreground deactivation threshold may be initially set at 2% and 4%, respectively, of the quantity of available memory. The thresholds may be adaptively defined based on a threshold factor that includes attributes of the data being written from the host. Such attributes may include a maximum length of data from the host that should be written at maximum speed, a maximum length of data from the host with a defined minimum write speed, a length of data that is likely to be written in a subsequent burst of continuous write activity by the host, and the average quantity of valid data in pink blocks selected for flush operations while background flushing is enabled. The threshold factor may include other characteristics of the data and memory system. The threshold factor may be based on historical operational statistics of the memory device, data tags and file tags received with the data from the host, from the distribution of logical block addresses allocated by the host, and/or other attributes.

In a first state 902, both background flushing and foreground flushing are disabled and the host may write data at maximum burst and sustained write speeds. The memory system 102 may be in the first state 902 if the determined quantity of available memory is greater than the background activation threshold. The memory system 102 may also enter the first state 902 from a second state 904 when the quantity of available memory increases to the background deactivation threshold. The quantity of available memory while in the first state 902 is greater than the background activation threshold and the foreground activation threshold. Therefore, in the first state 902, obsolete data may accumulate in pink blocks 410 as files are erased or updated by the host. This may minimize the amount of valid data relocated from a pink block 410 to available memory when flushing is performed in the second state 904 or third state 906.

In the second state 904, background flushing is enabled and foreground flushing is disabled. The host may write data at maximum burst and sustained write speeds in the second state 904 because background flushing only occurs when the host interface is idle. When the host interface is active, e.g., a read, write, or other command is received from the host, background flushing may be suspended. The memory system 102 may be in the second state 904 when the quantity of available memory is less than the background activation threshold and greater than the foreground activation threshold. The background activation threshold may be greater than the number of white blocks 404 required to store a predetermined maximum length of data to be written at a predetermined maximum speed. In this way, optimum write performance may be maintained because there will be enough room to store a maximum piece of data at a maximum speed from the host. In addition, the background deactivation threshold may exceed the background activation threshold by a predetermined amount such that the number of white blocks 404 created when background flushing is enabled will be sufficient to accommodate a subsequent host write operation with the predetermined amount of data.

The memory system 102 may also enter the second state 904 from the first state 902 when the quantity of available memory decreases to the background activation threshold, or from a third state 906 if the quantity increases to the foreground deactivation threshold. The foreground deactivation threshold may be less than or equal to the background activation threshold, in order to ensure that background flushing is enabled whenever foreground flushing is enabled.

In the third state 906, both background flushing and foreground flushing are enabled. The burst write speed and the sustained write speed in the third state 906 may be based on the density of obsolete data in pink blocks 410 being flushed. For example, when a larger amount of data is being relocated from pink blocks 410 to available memory, less data may be written from the host. The foreground activation threshold may be greater than the number of blocks required to maintain an acceptable predetermined write speed with an acceptable predetermined length of data to be written from the host, when foreground flushing is enabled. The memory system 102 may be in the third state 906 if the quantity of available memory is less than the background activation threshold and the foreground activation threshold. The memory system 102 may also enter the third state 906 from the second state 904 when the quantity of available memory decreases to the foreground activation threshold.

Figure 10:
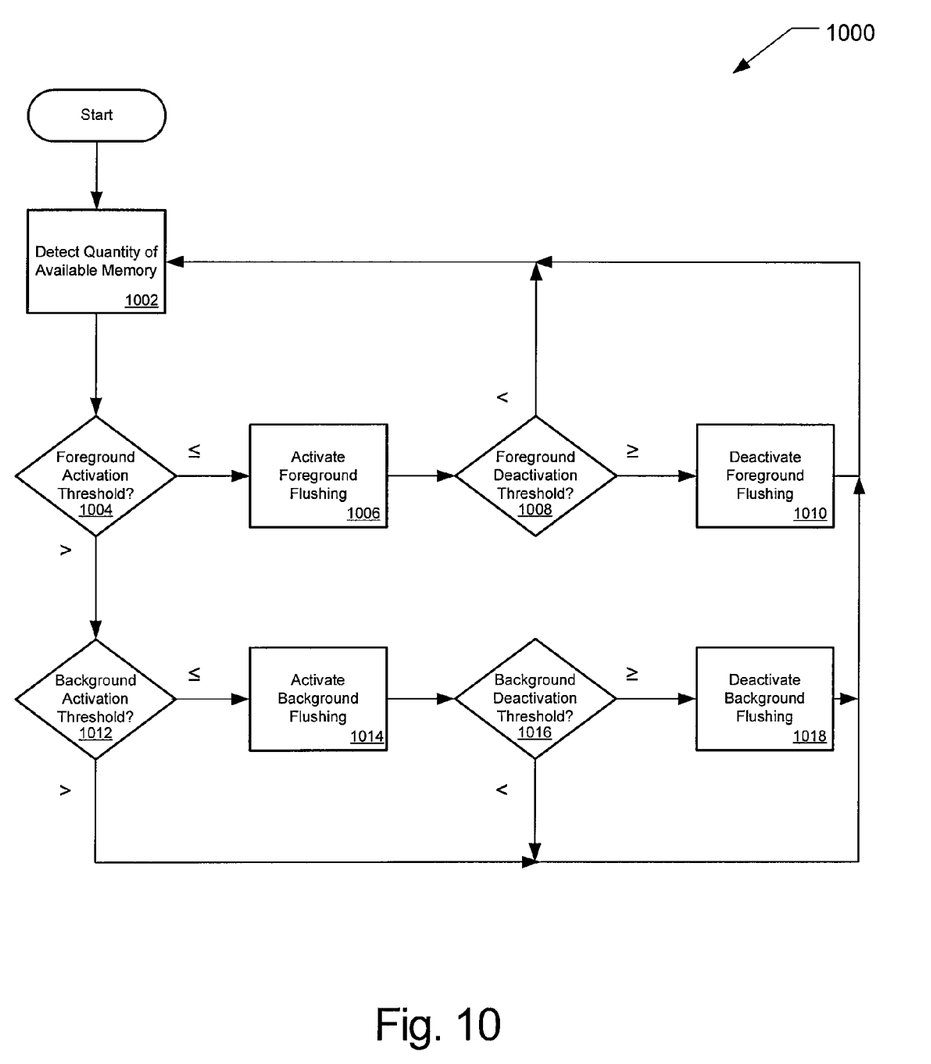
FIG. 10 is a flow diagram illustrating a method of flushing memory blocks according to an embodiment.

FIG. 10 is a flow diagram illustrating a method 1000 of flushing memory blocks according to an embodiment. At step 1002, a quantity of available memory may be detected. Available memory may include memory blocks having at least a portion of unwritten capacity or white blocks 404 having only unwritten capacity. The detected quantity of available memory may be compared to a foreground activation threshold at step 1004. If the quantity of available memory is less than or equal to the foreground activation threshold, the method 1000 continues to step 1006 and activates foreground flushing if it is not already enabled. If foreground flushing is already enabled, foreground flushing continues to be enabled.

When foreground flushing, the memory system 102 may, after receiving a write command from the host, interleave steps of host writing operations with steps of flushing operations until the write command is completed, where each step may be writing or flushing a particular unit of data, such as a page of data. The host writing operations may include writing data received from the host with the write command to the available memory. The flushing operations may include relocating valid data in a pink block 410 to the available memory. For example, in an Advanced Technology Attachment (ATA) interface, the host may send a write command to the memory device. The device may ask the host for data to write and the host may respond with the data to be written. Therefore, during foreground flushing, flush operations may be interleaved with received host commands, such as the write command or data sent from the host, as well as with requests to the host for data. The foreground flush operations may continue to be interleaved until the write command is fully completed, e.g., all data associated with the write command has been written.

The lengths of the interleaved steps of host writing operations and steps of flushing operations may affect the sustained write speed. The interleaving may be set such that a determined ratio of host writing steps and flushing steps is achieved. The ratio may be based on a balancing factor that includes attributes of the data being written from the host. Such attributes may include a maximum length of data from the host that should be written at maximum speed, a maximum length of data from the host with a defined minimum write speed, a length of data that is likely to be written in a subsequent burst of continuous write activity by the host, and the average quantity of valid data in pink blocks selected for flush operations while background flushing is enabled. The balancing factor may be based on historical operational statistics of the memory device, data tags and file tags received with the data from the host, from the distribution of logical block addresses allocated by the host, and/or other attributes.

The interleaving may be balanced such that the determined ratio of host writing operation steps and flushing operation steps is approximately 1:1. In this case, the net amount of white blocks 404 created by flushing operations may be approximately equal to the amount of data being written during host writing operations. Therefore, if the interleaving is balanced, the quantity of available memory does not change. For example, if a pink block 410 selected for foreground flushing contains X % valid data, a white block 404 will be created with a net usable amount of (100–X) % after the X % valid data is relocated. Accordingly, as the selected pink block 410 is being flushed, the host may write (100–X) % amount of data to the created white block 404 and the X % valid data in the selected pink block 410 may be relocated to the available memory.

The interleaving in foreground flushing may also be imbalanced to achieve a different write speed for a certain length of data to be written. In this case, the determined ratio of host writing operations and flushing operations may be something other than a 1:1 ratio. The ratio may be an integer or non-integer ratio. Imbalanced interleaving may be used when the data received from the host has a specified level of service requiring a certain write speed. For example, the write speed may be increased by interleaving a greater number of host data writing operations than flushing operations. In this case, the amount of white blocks 404 created by flushing operations may be reduced to accommodate the greater amount of data written by the host. In some situations, foreground flushing may be temporarily suspended to allow a predetermined length of data to be written at a predetermined speed that may be required for a specified level of service. As another example, the write speed may be decreased by interleaving a greater number of flushing operations than host data writing operations. The amount of data written by the host may decrease in this case to allow for the creation of a greater amount of white blocks 404 by flushing operations.

After foreground flushing has been activated or continues to be enabled at step 1006, the quantity of available memory may be compared to the foreground deactivation threshold at step 1008. If the quantity of available memory is less than the foreground deactivation threshold, then no further action occurs and the method 1000 returns to step 1002 to detect the quantity of available memory. However, if the quantity of available memory is greater than or equal to the foreground deactivation threshold, foreground flushing may be deactivated at step 1010. The method 1000 then returns to step 1002 and detects the quantity of available memory.

Referring back to step 1004, if the detected quantity of available memory is greater than the foreground activation threshold, the method 1000 continues to step 1012. At step 1012, the detected quantity of available memory may be compared to a background activation threshold. If the quantity of available memory is less than or equal to the background activation threshold, the method 1000 continues to step 1014 and activates background flushing if it is not already enabled. If background flushing is already enabled, background flushing continues to be enabled. When background flushing, the memory system 102 may perform a flush operation to relocate valid data from pink blocks 410 to available memory when the host interface is idle, e.g., when a read, write, or other command is not being received from the host. When the host interface is active, no flush operation occurs if background flushing is enabled. As such, the maximum burst write speed and the maximum sustained write speed are not affected when background flushing is enabled.

After background flushing has been activated or continues to be enabled at step 1014, the quantity of available memory may be compared to the background deactivation threshold at step 1016. If the quantity of available memory is less than the background deactivation threshold, then the method 1000 returns to step 1002. However, if the quantity of available memory is greater than or equal to the background deactivation threshold, background flushing may be deactivated at step 1018. The method 1000 then returns to step 1002 and detects the quantity of available memory.

When background flushing is disabled, valid data may still be relocated from a pink block 410 to available memory when the host interface is idle, if the quantity of valid data in a pink block 410 selected for a next flushing operation is less than an override threshold. The override threshold may be based on an average quantity of valid data in pink blocks 410 when background flushing is enabled. Overriding the disabled background flushing in this manner may allow a pink block 410 that would have been flushed when background flushing becomes enabled to be preemptively flushed.

A system and method has been disclosed for scheduling background flushing and foreground flushing of physical blocks in a memory device. The method activates and deactivates background flushing and foreground flushing based on a quantity of available memory with respect to adaptive thresholds. The adaptive thresholds may be based on characteristics of the data being written from a host to the memory device. Scheduling background and foreground flushing in this manner may maximize the burst write speed and sustained write speed and allow data to be written from the host in an optimal manner. In addition, the amount of data relocated during flush operations may be minimized, resulting in a prolonged memory device lifetime.

I claim:

1. A method of flushing memory blocks in a memory device in communication with a host, comprising:
   detecting a quantity of available memory in the memory device, wherein the available memory comprises unwritten capacity in memory blocks;
   background flushing partially obsolete memory blocks if the quantity of available memory decreases to a background flushing activation threshold, wherein the partially obsolete memory blocks comprise memory blocks having only obsolete data and valid data and background flushing comprises relocating valid data from the partially obsolete memory blocks to the available memory when a host interface is idle;
   disabling the background flushing if the quantity of available memory increases to a background flushing deactivation threshold, wherein the background flushing activation threshold is less than the background flushing deactivation threshold;
   overriding disabling of background flushing when a quantity of valid data in a selected partially obsolete memory block is less than an override threshold, wherein the override threshold comprises an average quantity of valid data in the partially obsolete memory blocks during the background flushing;
   foreground flushing the partially obsolete memory blocks if the quantity of available memory decreases to a foreground flushing activation threshold, wherein foreground flushing comprises after a host write command is received, interleaving host writing operations and flushing operations while the host write command is unfinished, the host writing operations comprising steps of storing data received with the host write command to the available memory and the flushing operations comprising steps of relocating valid data from the partially obsolete memory blocks to the available memory; and
   disabling the foreground flushing if the quantity of available memory increases to a foreground flushing deactivation threshold, wherein the foreground flushing activation threshold is less than the foreground flushing deactivation threshold.

2. The method of claim 1, wherein relocating valid data from the partially obsolete memory blocks to the available memory comprises:
   selecting one of the partially obsolete memory blocks with a smallest quantity of valid data; and
   copying the valid data from the one of the partially obsolete memory blocks to the available memory.

3. The method of claim 1, wherein the host interface is idle when the memory device is not receiving a command from the host.

4. The method of claim 1, wherein foreground flushing further comprises:
   determining a ratio of storing data steps and relocating valid data steps; and
   interleaving the host writing operations and the flushing operations to achieve the determined ratio.

5. The method of claim 4, wherein the ratio is approximately 1:1.

6. The method of claim 4, wherein determining the ratio is based on a balancing factor, the balancing factor comprising at least one of a length of data received with the host write command or a desired write speed.

7. The method of claim 6, wherein the balancing factor is based on at least one of historical operational statistics of the memory device, data tags, file tags, or distribution of logical block addresses allocated by the host.

8. The method of claim 1, further comprising relocating valid data from a selected partially obsolete memory block to the available memory when the host interface is idle, when disabling of the background flushing is overridden.

9. The method of claim 1, wherein the background flushing activation threshold, the background flushing deactivation threshold, the foreground flushing activation threshold, and the foreground flushing deactivation threshold are based on a threshold factor, the threshold factor comprising at least one of a length of data received with the host write command, a desired write speed, or an average quantity of valid data in the partially obsolete memory blocks during the background flushing.

10. The method of claim 9, wherein the threshold factor is based on at least one of historical operational statistics of the memory device, data tags, file tags, or distribution of logical block addresses allocated by the host.

11. The method of claim 1, wherein the background flushing activation threshold is greater than or equal to a predetermined maximum length of data received with the host write command at a predetermined maximum write speed.

12. The method of claim 1, wherein the foreground flushing activation threshold is greater than or equal to a predetermined length of data received with the host write command at a predetermined write speed.

13. The method of claim 1, wherein the foreground flushing activation threshold is less than the background flushing activation threshold.

14. The method of claim 1, wherein the foreground flushing deactivation threshold is less than or equal to the background flushing activation threshold.

15. The method of claim 1, wherein the available memory comprises unwritten capacity in blocks having at least a portion of unwritten capacity and at least one of valid data or obsolete data, and unwritten capacity in blocks having only unwritten capacity.

16. A method of flushing memory blocks in a memory device in communication with a host, comprising:
   detecting a quantity of available memory in the memory device, wherein the available memory comprises unwritten capacity in memory blocks;
   if the quantity of available memory reaches a background flushing activation threshold, then relocating valid data from partially obsolete memory blocks to the available memory when no host write command is received, wherein the partially obsolete memory blocks comprise memory blocks having only obsolete data and valid data, wherein background flushing is disabled if the quantity of available memory increases to a background flushing deactivation threshold, and wherein the background flushing activation threshold is less than the background flushing deactivation threshold;
   overriding disabling of background flushing when a quantity of valid data in a selected partially obsolete memory block is less than an override threshold, wherein the override threshold comprises an average quantity of valid data in the partially obsolete memory blocks during the background flushing;
   if the quantity of available memory reaches a foreground flushing activation threshold that is less than the background flushing activation threshold, then after receiving a host write command, interleaving between steps of storing data received with the host write command to the available memory and steps of relocating valid data from the partially obsolete memory blocks to the available memory, while the host write command is unfinished; and wherein, foreground flushing is disabled if the quantity of available memory increases to a foreground flushing deactivation threshold, and wherein the foreground flushing activation threshold is less than the foreground flushing deactivation threshold.

17. The method of claim 16, wherein relocating valid data from the partially obsolete memory blocks to the available memory comprises:

selecting one of the partially obsolete memory blocks with a smallest quantity of valid data; and copying the valid data from the one of the partially obsolete memory blocks to the available memory.

18. The method of claim 16, further comprising if the quantity of available memory reaches the foreground flushing activation threshold, balancing the interleaving of relocating valid data steps and storing data steps such that the quantity of available memory remains substantially constant.

19. The method of claim 16, further comprising if the quantity of available memory reaches the foreground flushing activation threshold, interleaving a greater number of the storing data steps than the relocating valid data steps such that the quantity of available memory decreases and a write speed of the memory device increases.

20. The method of claim 16, further comprising if the quantity of available memory reaches the foreground flushing activation threshold, interleaving a greater number of the relocating valid data steps than the storing data steps such that the quantity of available memory increases and a write speed of the memory device decreases.

21. The method of claim 16, wherein the foreground flushing activation threshold is greater than or equal to a predetermined length of data received with the host write command at a predetermined write speed.

22. The method of claim 16, wherein the background flushing activation threshold is greater than or equal to a predetermined maximum length of data received with the host write command at a predetermined maximum write speed.

23. The method of claim 16, further comprising if the quantity of available memory reaches a background flushing deactivation threshold that is greater than the background flushing activation threshold, accumulating obsolete data in the partially obsolete memory blocks.

24. The method of claim 16, wherein the available memory comprises unwritten capacity in blocks having at least a portion of unwritten capacity and at least one of valid data or obsolete data, and unwritten capacity in blocks having only unwritten capacity.

* * * * *